US012769723B2

(12) United States Patent
Okabe et al.

(10) Patent No.: US 12,769,723 B2
(45) Date of Patent: Oct. 20, 2026

(54) MANAGEMENT DEVICE

(71) Applicant: DENSO CORPORATION, Kariya-city (JP)

(72) Inventors: Tatsuya Okabe, Kariya-city (JP); Koichi Nagata, Kariya-city (JP); Isao Tabushi, Tokyo (JP); Dan Tachibana, Wako (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/620,596

(22) Filed: Mar. 28, 2024

(65) Prior Publication Data

US 2024/0330274 A1 Oct. 3, 2024

(30) Foreign Application Priority Data

Mar. 30, 2023 (JP) ................................ 2023-055707

(51) Int. Cl.
*G06F 7/00* (2006.01)
*G06F 16/23* (2019.01)

(52) U.S. Cl.
CPC ................................ *G06F 16/2379* (2019.01)

(58) Field of Classification Search
CPC ............ G06F 16/2379; G06F 16/9024; G06F 16/906; G06F 16/35; G06F 16/3344; G06F 16/783; G06F 16/78; G06F 16/9558; G06F 16/951; G06F 21/64; G06Q 20/389; G06Q 20/4016; G06Q 20/367; G06Q 20/208; G06Q 20/20; G06Q 20/36
See application file for complete search history.

(56) References Cited

U.S. PATENT DOCUMENTS

2004/0153190 A1 8/2004 Zhang
2016/0164884 A1 6/2016 Sriram et al.
2019/0377904 A1 12/2019 Sinha et al.
2020/0052883 A1* 2/2020 Dender ................ H04L 63/126
2020/0211005 A1* 7/2020 Bodorik .................... G06F 9/54
2021/0119768 A1* 4/2021 Han ...................... H04L 9/3239
2022/0092532 A1* 3/2022 Bevan ................ G06Q 10/0835
2022/0122026 A1 4/2022 Okabe et al.
2022/0237628 A1* 7/2022 Wollack ................ G06Q 10/08
2024/0034561 A1 2/2024 Ma et al.

FOREIGN PATENT DOCUMENTS

CN 110059935 A 7/2019

* cited by examiner

*Primary Examiner* — Mohammad A Sana
(74) *Attorney, Agent, or Firm* — Precision Patents, P.C.

(57) ABSTRACT

A management device includes: a blockchain that is configured to record transaction data of material of a product; a variation range registrar that is configured to register data on a variation range of a weight of material allowed in a transaction process to the blockchain; and a transaction data registrar that is configured to receive input of data regarding a transaction including data on the weight of material and registers the data of transaction to the blockchain.

4 Claims, 7 Drawing Sheets

FIG. 7

| TIME | Wi | Wo | W | γ | [α, β] |
|---|---|---|---|---|---|
| T0 | SUBTOTAL | SUBTOTAL | ACTUAL MEASUREMENT | UNDEFINED | [0.90, 1.10] |
| T1 | 100 | 50 | [0+90-50, 0+110-50] = [40, 60] | NOT YET CALCULATED | [0.90, 1.10] |
| T2 | 200 | 200 | [40+180-200, 60+220-200] = [20, 80] | NOT YET CALCULATED | [0.90, 1.10] |
| T3 | 300 | 250 | [20+270-250, 80+330-250] = [40, 160] | NOT YET CALCULATED | [0.90, 1.10] |
| T4 | 200 | 150 | [40+180-150, 160+220-150] = [70, 230] | NOT YET CALCULATED | [0.90, 1.10] |
| T5 | SUBTOTAL 800 | SUBTOTAL 650 | ACTUAL MEASUREMENT 150 | 1.000 | 0.8*[0.90, 1.10]+0.2*1.000*[1, 1] = [0.92, 1.08] |
| T6 | 200 | 300 | [150+184-300, 150+216-300] = [34, 66] | NOT YET CALCULATED | [0.92, 1.08] |
| T7 | 400 | 400 | [34+368-400, 66+432-400] = [2, 98] | NOT YET CALCULATED | [0.92, 1.08] |
| T8 | 800 | 900 | [2+736-900, 98+864-900] = [-162, 62] | NOT YET CALCULATED | [0.92, 1.08] |
| T9 | 700 | 600 | [-162+644-600, 62+756-600] = [-118, 218] | NOT YET CALCULATED | [0.92, 1.08] |
| T10 | SUBTOTAL 2100 | SUBTOTAL 2200 | ACTUAL MEASUREMENT 100 | 1.02381 | 0.8*[0.92, 1.08] + 0.2*1.02381*[1, 1] = [0.940762, 1.068762] |
| T11 | 200 | 250 | [38.15238, 63.75238] | NOT YET CALCULATED | [0.940762, 1.068762] |
| T12 | 300 | 200 | [120.381, 184.381] | NOT YET CALCULATED | [0.940762, 1.068762] |
| T13 | 400 | 400 | [96.68571, 211.8857] | NOT YET CALCULATED | [0.940762, 1.068762] |
| T14 | 200 | 200 | [84.8381, 225.6381] | NOT YET CALCULATED | [0.940762, 1.068762] |
| T15 | SUBTOTAL 1100 | SUBTOTAL 1050 | ACTUAL MEASUREMENT 200 | 1.045455 | [0.9617, 1.0641] |
| T16 | 600 | 700 | [77.02026, 138.4603] | NOT YET CALCULATED | [0.9617, 1.0641] |
| T17 | 600 | 500 | [154.0405, 276.9205] | NOT YET CALCULATED | [0.9617, 1.0641] |
| T18 | 500 | 600 | [34.89074, 208.9707] | NOT YET CALCULATED | [0.9617, 1.0641] |

MANAGEMENT DEVICE

CROSS REFERENCE TO RELATED APPLICATION

The present application claims the benefit of priority from Japanese Patent Application No. 2023-055707 filed on Mar. 30, 2023. The entire disclosure of the above application is incorporated herein by reference.

TECHNICAL FIELD

The present disclosure relates to traceability technology using blockchain.

BACKGROUND

Traceability technology using databases and blockchain is very convenient for correctly tracing material used in a process of manufacturing, using, and recycling, and many technical proposals have already been made.

In particular, when using traceability technology that uses virtual-currency-based blockchain, there is no risk of unauthorized increases or decreases in the amount of material during a process of manufacturing. That is, data communication involving increase or decrease of material during a process of manufacturing is not allowed in the world of blockchain, since increase/decrease of material allowed during a process of manufacturing means increase/decrease of money during transaction in the world, in a sense.

Thus, it is convenient (for the manufacturer) to build a system for preventing the introduction of unauthorized raw materials and unauthorized diversion, because, based on the traceability technology while utilizing the above-described basic concept, the system is made extremely transparent.

SUMMARY

According to one aspect of the present disclosure, a management device includes: a blockchain that is configured to record transaction data of material of a product; a variation range registration unit that is configured to register, on the blockchain, data indicative of a variation range, the variation range being an allowable range of a weight of material in a transaction process; and a transaction data registration unit that is configured to receive an input of the transaction data including data of a weight of material and is configured to register the transaction data on the blockchain.

BRIEF DESCRIPTION OF DRAWINGS

Objects, features and advantages of the present disclosure will become apparent from the following detailed description made with reference to the accompanying drawings. In the drawings:

FIG. 7 is a diagram showing an example of updating the variation range.

DETAILED DESCRIPTION

Next, a relevant technology will be described below only for understanding the following embodiment.

Even when there is no malicious intent, it is actually possible for raw materials to lose weight during a process of manufacturing. For example, there may be a case that a portion of gasoline or the like evaporates, a case that seasonings or the like are spilled during a process of manufacturing, or a case that a portion of the material adheres to casing and is left unprocessed. Similarly, even when there is no malicious intent, it is actually possible that the amount of raw materials increases during processing. For example, iron reacts with oxygen in the air to form iron oxide, and dehumidifiers absorb moisture from the air.

Figure 1A:
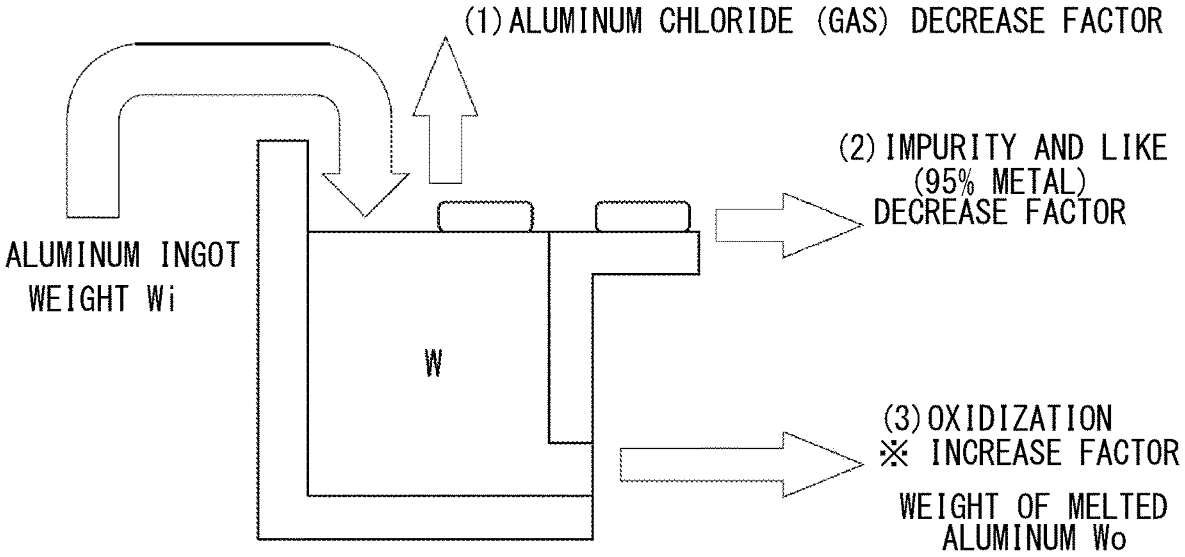
FIG. 1A is a comparative diagram showing a case in which an aluminum ingot is melted in a melting furnace and liquid molten aluminum is taken out from the melting furnace.
Figure 1B:
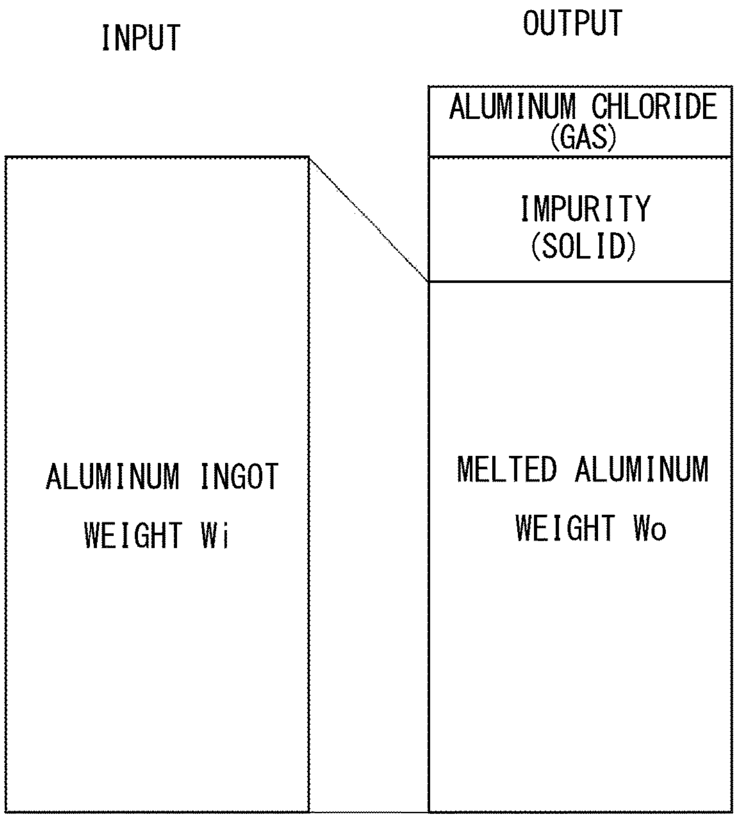
FIG. 1B is a diagram showing a comparison of amounts of input aluminum ingot and output molten aluminum.

FIG. 1A is a comparative diagram showing a case in which an aluminum ingot is melted in a melting furnace, and liquid molten aluminum is taken out from the melting furnace. When an aluminum ingot is melted, a part of it becomes aluminum chloride and vaporizes, and also a part of it reacts with impurities during manufacturing, thereby removed as unusable from processing. These cases are factors that reduce the amount of molten aluminum output. Conversely, aluminum is oxidized to produce aluminum oxide, which is a factor causing an increase in output. At least for the reasons described above, as shown in FIG. 1B, the amount of molten aluminum in the output decreases with respect to the input aluminum ingot even when there is no fraud.

When managing such materials using traceability technology that uses a regular database or blockchain, there has been a problem that a decrease in the amount of materials will be treated as unauthorized diversion, and an increase in the amount of materials will be treated as a false increase of the material.

In view of the above background, it is one objective of the present disclosure to provide traceability technology that appropriately manages the amount of material even when a quantity of material increases or decreases during a transaction. According to a first aspect of the present disclosure, a management device includes: a blockchain that is configured to record transaction data of material of a product; a variation range registration unit that is configured to register, on the blockchain, data indicative of a variation range, the variation range being an allowable range of a weight of material in a transaction process; and a transaction data registration unit that is configured to receive an input of the transaction data including data of a weight of material and is configured to register the transaction data on the blockchain.

According to a second aspect of the present disclosure, a management system includes the above-described management device; and a user device that is configured to receive an input of the transaction data and to transmit the received transaction data to the management device. The transaction data registration unit of the management device is further configured to register the transaction data received from the user device.

According to a third aspect of the present disclosure, a management method is a method for recording, on a blockchain, and managing transaction data of material of a product. The management method includes: registering, with a management device, data indicative of a variation range on the blockchain, the variation range being an allowable range of a weight of material in a transaction process; and receiving, with the management device, an input of the transaction data including data of a weight of the material and registering the transaction data on the blockchain.

According to a fourth aspect of the present disclosure, a non-transitory, computer readable, tangible storage medium storing a program for recording, on a blockchain, and managing transaction data of material of a product. The program causes a computer to perform steps of: registering, on the blockchain, data indicative of a variation range that is an allowable range of a weight of material in a transaction process; and receiving an input of the transaction data including data of a weight of the material and registering the transaction data on the blockchain.

According to the present disclosure, it is possible (a) to allow variations in the weight of material, and (b) to trace a point of variation, i.e., where the variation has occurred in an event that the variation exceeds a registered variation range.

Next, a management system and a management device of the present embodiment will be described below with reference to the drawings. Note that the following description merely shows an example of a preferred embodiment, and is not intended to limit the disclosure described in the claims.

Figure 2:
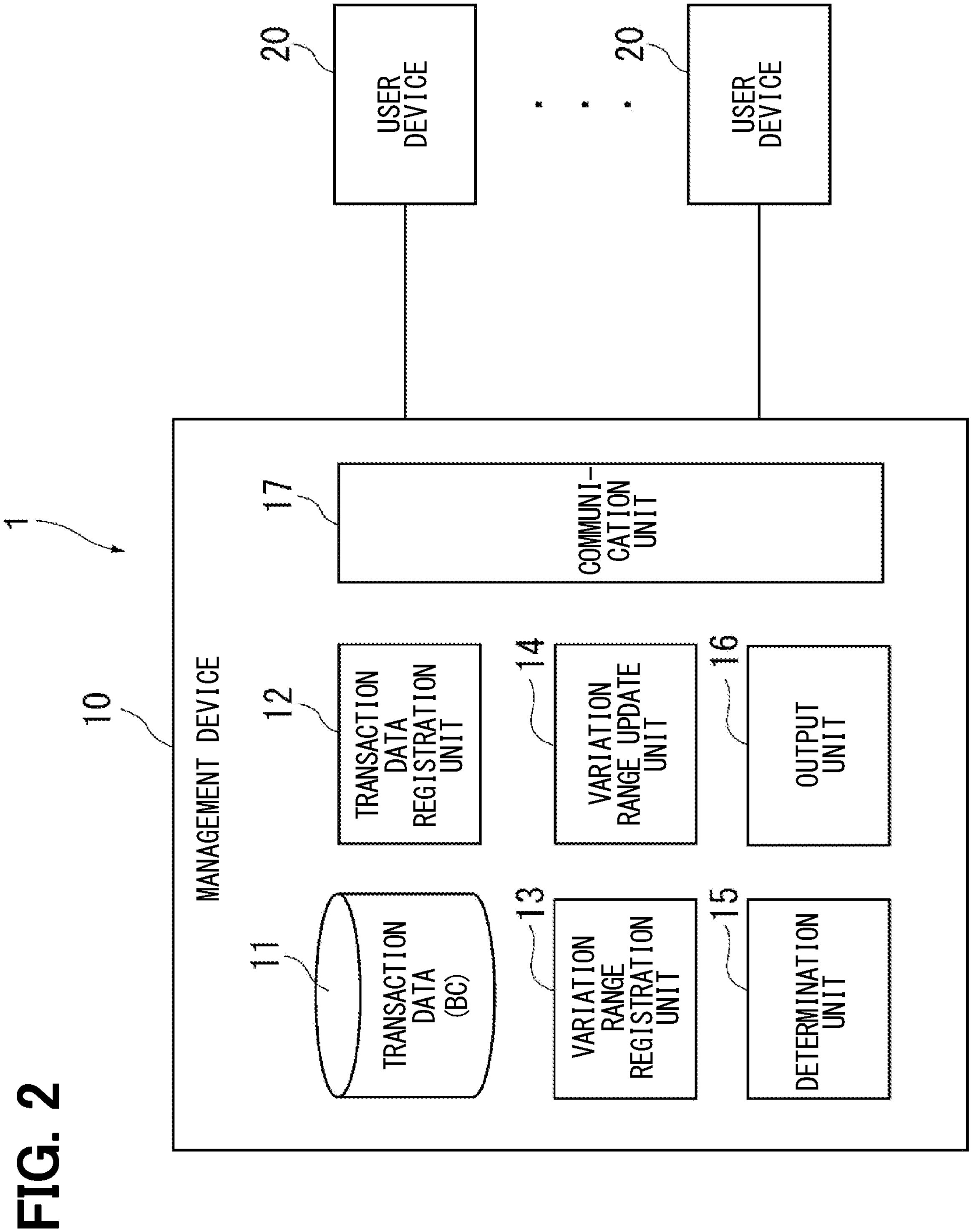
FIG. 2 is a diagram showing a configuration of a management system according to an embodiment.

FIG. 2 is a diagram showing a configuration of a management system 1 according to an embodiment. The management system 1 includes a management device 10 that manages a blockchain 11 of transaction data, and a user device 20 connected to the management device 10 via a network. The user device 20 is placed, for example, at a base such as a supplier's factory, and has a function of receiving input of (i) data regarding materials received from the supplier and (ii) data regarding materials used. Transaction data input to the user device 20 is transmitted to the management device 10 and is managed by the management device 10.

The management device 10 includes the blockchain 11 for recording transaction data, a transaction data registration unit 12, a variation range registration unit 13, a variation range update unit 14, a determination unit 15, an output unit 16, and a communication unit 17. The management device 10 uses the communication unit 17 to transmit and receive data to and from the user device 20. The blockchain 11 is a type of database technology that records information, managing data in units called blocks, and storing the data by connecting them like a chain. The blockchain 11 may manage transaction data in a distributed manner using a plurality of nodes.

Figure 3:
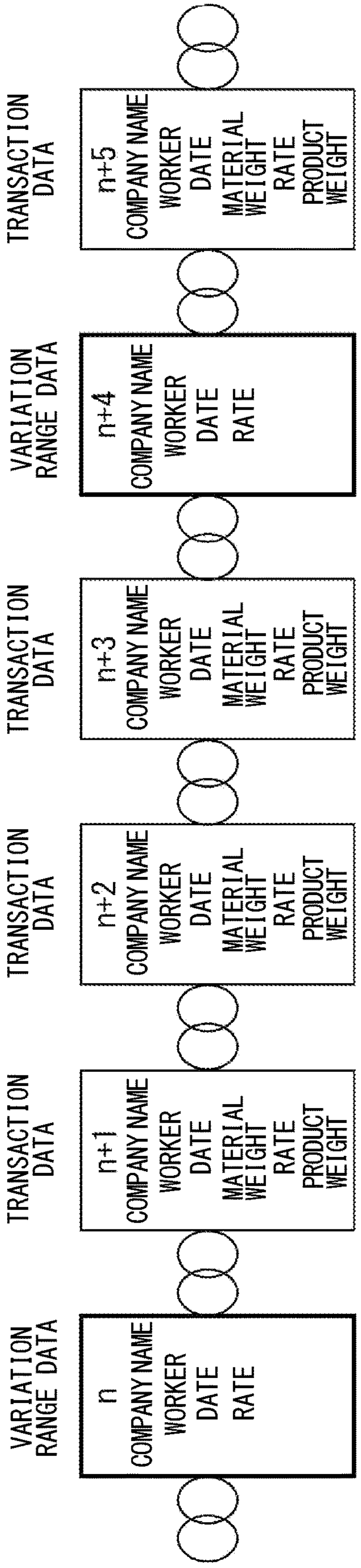
FIG. 3 is an example of data recorded in a blockchain by a management device according to the embodiment.

FIG. 3 is an example of data recorded in the blockchain 11 by the management device 10 of the present embodiment. Each block is given a serial number. In FIG. 3, blocks with serial numbers from n to n+5 are described. The blockchain 11 includes blocks that record transaction data and blocks that record variation range data.

A transaction data block records data such as "company name," "worker," "date," "material weight," "rate," and "product weight." A variation range data block records data such as "company name," "worker," "date," and "rate." Although not described, in addition to the data shown in FIG. 3, a hash value and nonce data of the previous block are also recorded in the actual blockchain. Further, general traceability data such as other transaction data, supply chain data, manufacturing data, manufacturing method, and the like may also be recorded.

The transaction data registration unit 12 has a function of (a) receiving transaction data transmitted from the user device 20 and (b) registering the transaction data to the blockchain 11. The variation range registration unit 13 has a function of registering data on an allowable variation range regarding a weight of a material. The variation range update unit 14 has a function of calculating and updating the allowable variation range based on an actual weight variation of the material.

The determination unit 15 has a function of (a) comparing an actual measurement value of the weight of the material with the variation range, and (b) determining whether the actual measurement value of the weight of the material is within the variation range. Data of the actual measurement value may be input from an input unit (not shown) or may also be received from the user device 20. The output unit 16 has a function of outputting a warning that notifies that the actual measurement value exceeds the allowable variation range when the actual measurement value is not within the allowable variation range.

Figure 4:
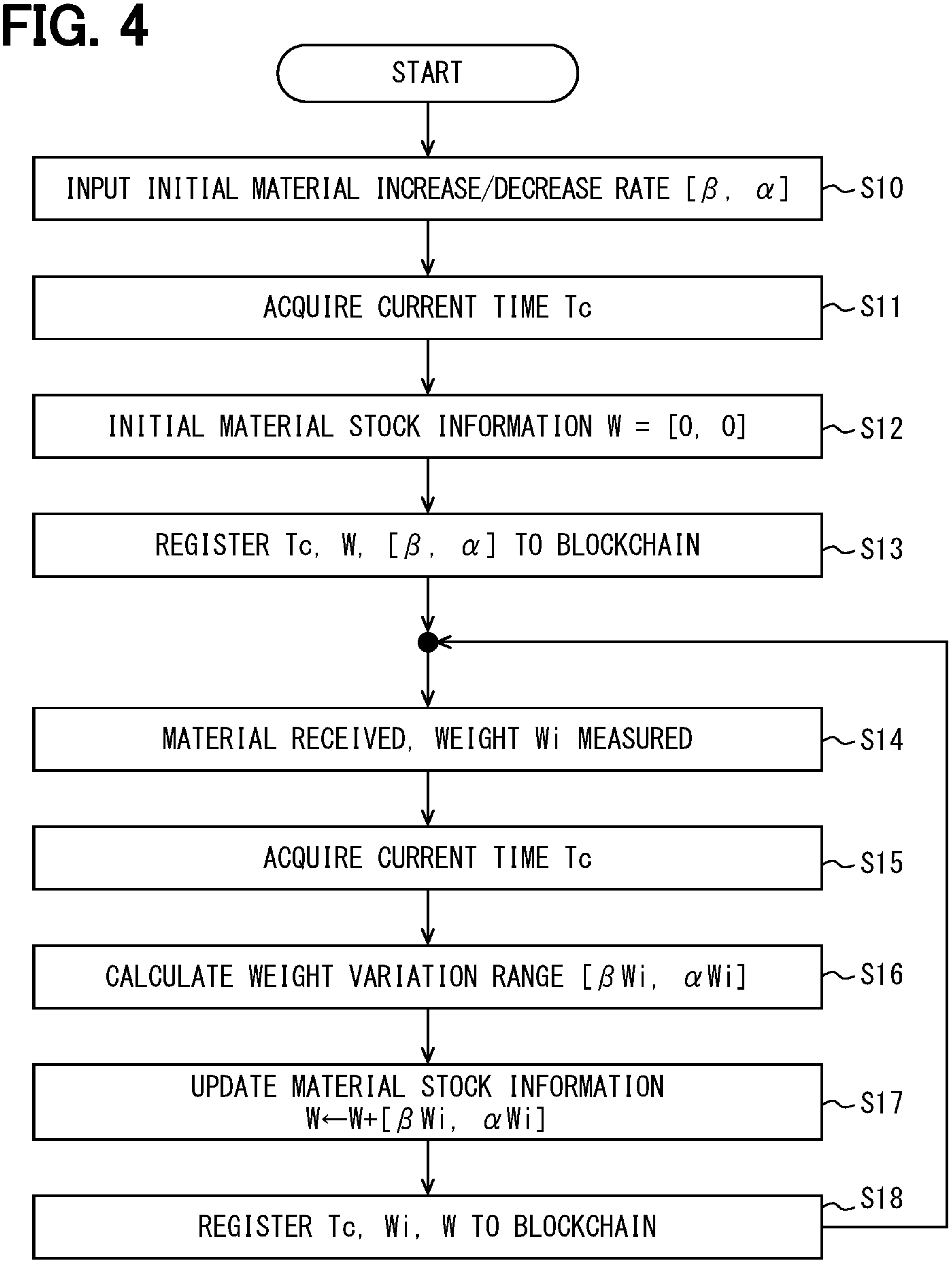
FIG. 4 is a diagram showing an operation of registering transaction data to the blockchain when material arrives.

FIG. 4 is a diagram showing an operation of registering transaction data to the blockchain 11 when receiving materials. Here, explanation will be given using an example of an aluminum ingot shown in FIG. 1. The management device 10 first receives an input of an initial material increase/decrease rate [$\beta$, $\alpha$] (S10). The material increase/decrease rate is data indicating an allowable variation range regarding the increase/decrease of material when an aluminum ingot is converted into molten aluminum, with $\alpha$ being an upper limit and $\beta$ being a lower limit. For example, when a rate of variation regarding an output versus an input is allowed to vary within a range of 98% to 103%, $\alpha$=1.03 and $\beta$=0.98. The input described above is an initial value of the material increase/decrease rate.

The transaction data registration unit 12 of the management device 10 acquires a current time Tc (S11), and registers an initial material stock information W=[0, 0] (S12). Generally, material stock information is expressed in a scalar format, such as W=0. However, in order to consider an upper limit amount and a lower limit amount of the material, it is expressed in a vector format. Registration of the initial material stock information W means initializing a variable W by setting an upper limit value and a lower limit value of the variable W to 0 (S13). The current time Tc is registered to the blockchain 11 as a timestamp.

When the material is received, the supplier measures a weight Wi of the material (S14). Here, 'I' is a subscript indicating an input. The transaction data registration unit 12 acquires a current time Tc (S15). Next, the transaction data registration unit 12 calculates a variation range [$\beta$Wi, $\alpha$Wi] of the weight of the received material (aluminum) (S16). That is, a range of variation in the weight of aluminum when an aluminum ingot is melted is calculated.

The transaction data registration unit 12 adds a weight having the calculated variation range to the weight of the stock material, and updates the material stock information (S17). Since a weight having a variation range is added to the material stock, the weight of the material stock also has a variation range. Specifically, the weight of the material stock is a value having a variation range of [$\Sigma\beta$Wi, $\Sigma\alpha$Wi]. The transaction data registration unit 12 of the management device 10 registers the current time Tc, the weight Wi of the received material, and the updated material stock information W to the blockchain 11 (S18). At this time, the transaction data registration unit 12 also registers the name of the company that has supplied the material and the name of the worker who has performed the work.

Figure 5:
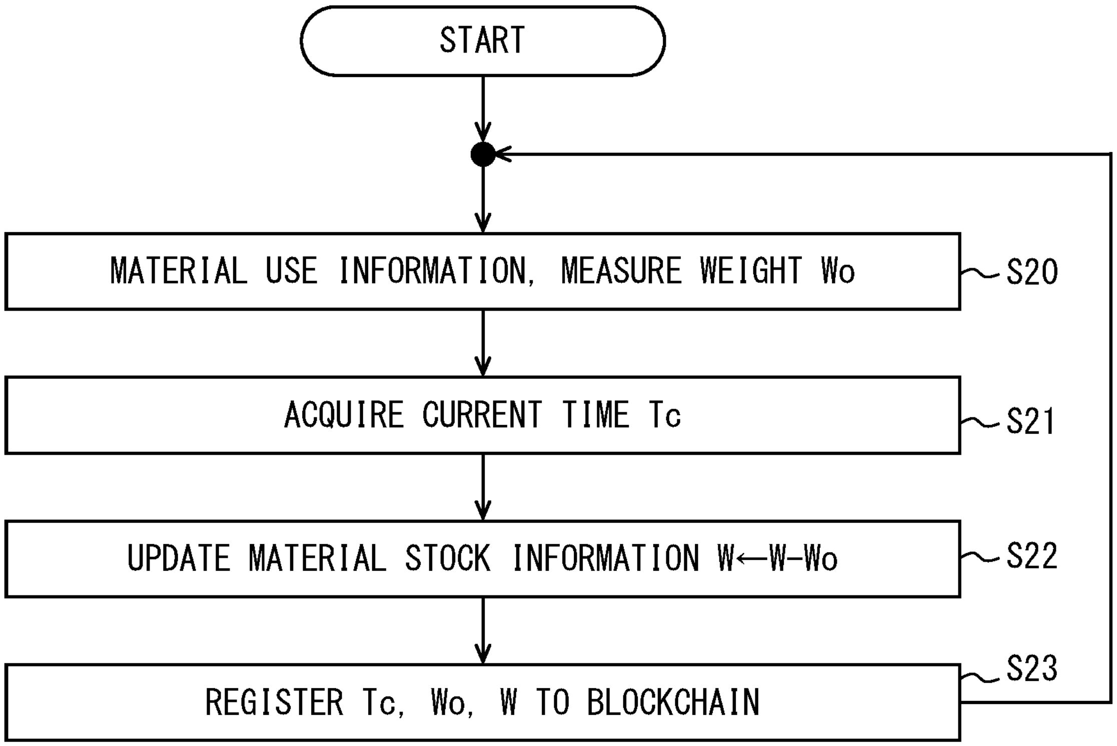
FIG. 5 is a diagram showing an operation of registering transaction data to the blockchain when shipping and processing the material.

FIG. 5 is a diagram showing an operation of registering transaction data to the blockchain 11 when shipping and processing the material. When the material is shipped and processed, the supplier measures a weight Wo of the material used (in this case, molten aluminum) (S20). Here, 'o' is a subscript indicating an output. The transaction data registration unit 12 of the management device 10 acquires a current time Tc (S21), and updates the material stock information W (S22). Specifically, the weight Wo of the used material is subtracted from the weight W of the material stock, and the result of subtraction is used as new material stock information W. The transaction data registration unit 12 registers the current time Tc, the weight Wo of the used material, and the updated material stock information W to the blockchain 11 (S23). At this time, the transaction data registration unit 12 also registers the name of the company that has used the material and the name of the worker who has performed the work.

In such manner, by registering data on the allowable range of weight of the material to the blockchain along with the transaction data including material weight data, while allowing variation of weight of the material changing within the registered variation range, it is possible to detect the variation of weight exceeding the registered variation range. By examining the blocks registered to the blockchain 11, it is possible to trace a large amount of variation, i.e., to detect such a variation occurring at what stage of transaction, thereby making it possible to discover fraud, such as diversion of the material (away from manufacturing) and/or false increase of the amount of the material. Further, since the company name and worker are registered in each block, it becomes clear who is responsible and it is possible to interview the worker, for example.

Figure 6:
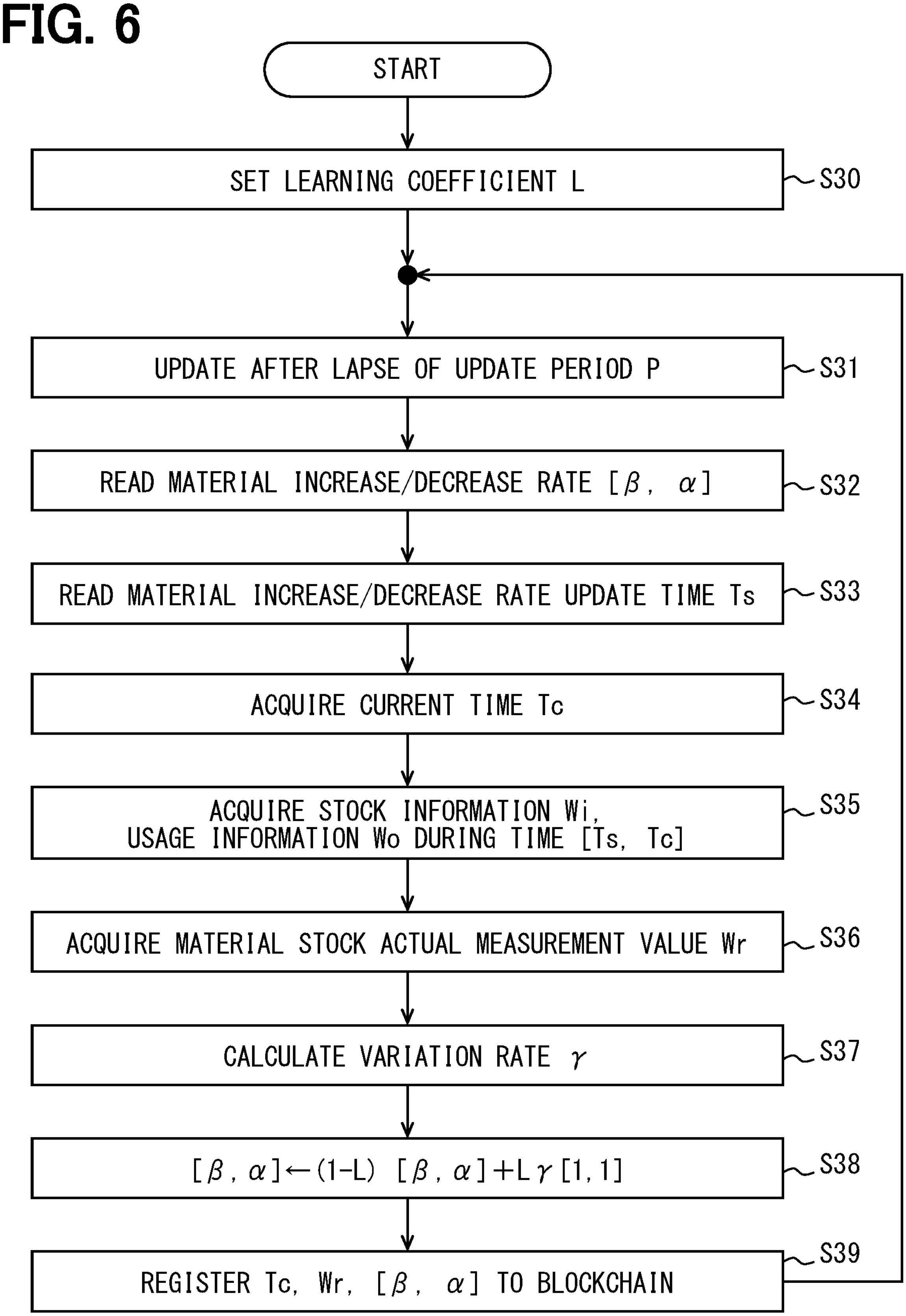
FIG. 6 is a diagram showing an operation for updating a variation range.

FIG. 6 is a diagram showing an operation for updating the variation range. The variation range update unit 14 of the management device 10 receives a setting of a learning coefficient L (S30). The variation range update unit 14 performs an update of the variation range as described below after an update period P (for example, 3 months) has elapsed (S31). Note that, in FIG. 6, an example is described in which the variation range is updated as the update period P elapses. However, an update of the variation range may be started periodically, or manually, for example, when an error from the actual measurement value is large.

The variation range update unit 14 reads the current material increase/decrease rate [β, α] (S32). Next, the variation range update unit 14 reads an update time Ts of the material increase/decrease rate (S33) and acquires a current time Tc (S34). The update time Ts may be a time when the current material increase/decrease rate is updated. The variation range update unit 14 acquires reception information Wi ($Wi_1$, $Wi_2$, . . . , $Wi_N$) and usage information Wo ($Wo_1$, $Wo_2$, . . . , $Wo_M$) during time [Ts, Tc] (S35), and also acquires an actual measurement value Wr,c of the current material stock and an actual measurement value Wr,b of the material stock when the variation range was previously set (S36).

The variation range update unit 14 calculates a variation rate γ based on a theoretical value of a material stock value derived from the reception information Wi and the usage information Wo, the current actual measurement value Wr,c, and the previous actual measurement value Wr,b (S37). The relationship between the current actual measurement value Wr,c and the previous actual measurement value Wr,b is expressed as follows using the variation rate γ.

$$Wr,c = Wr,b + \gamma(Wi_1 + Wi_2 + \ldots + Wi_N) - (Wo_1 + Wo_2 + \ldots + Wo_M)$$

Therefore, the variation rate γ is $$\gamma = (Wr,c - Wr,b + Wo_1 + Wo_2 + \ldots + Wo_M)/(Wi_1 + Wi_2 + \ldots + Wi_N)$$

The variation range update unit 14 uses the value of this variation rate γ to acquire new [β, α] using the following equation (S38).

$$[\beta, \alpha] \leftarrow (1 - L)[\beta, \alpha] + L\gamma[1, 1]$$

As can be seen from the equation described above, the larger the learning coefficient is, the greater the influence of the variation rate γ regarding variation from the previous measurement value to the current measurement value becomes, and the smaller the learning coefficient is, the greater the influence of the original variation range [β, α]. For example, when L=1, it means that the latest variation rate is always used, and, when L=0, it means that use of the initially-set variation rate is continued. Generally, for avoiding sudden/steep variation, a relatively small value between 0 and 1 is used for L. Further, L may be dynamically varied between 0 and 1.

The variation range update unit 14 of the management device 10 registers the current time Tc, the actual measurement value Wr of the material, and the new variation range [β, α] to the blockchain 11 (S39). At this time, the transaction data registration unit 12 also registers the name of the company that has used the material and the name of the worker who has performed the work.

By updating the variation range in a manner described above, the variation range is refined based on actual data.

FIG. 7 shows an example in which a rate of the variation range is updated at a constant period (after lapse of every 5 periods) with the learning coefficient L=0.2. At time T0, the actual measurement value of the material stock is 0, and the variation range is [0.90, 1.10]. There are inputs and outputs as shown in FIG. 7 between times T1 and T4, and the variation range is updated at time T5. From the inputs and outputs at times T1 to T4 and the actual measurement values at times T0 and T5, the variation rate γ is determined as follows.

$$\gamma = (150 - 0 + 650)/800 = 1$$

Therefore, a new variation range is acquired as follows.

$$[\beta, \alpha] = 0.8 \times [0.90, 1.10] + 0.2 \times 1 \times [1, 1] = [0.92, 1.08]$$

Regarding the update of the variation range at time T10, the variation range γ is acquired from the inputs and outputs from times T6 to T9 and the actual measurement values at times T5 and T10 as follows.

$$\gamma=(100-150+2200)/2100=1.02381$$

Therefore, a new variation rate is acquired as follows.

$$[\beta,\alpha]=0.8\times[0.92,1.08]+0.2\times1.02381\times[1,1]=[0.940762,1.068762]$$

In such manner, by periodically updating the variation range based on the actual data, the variation range is set to a more appropriate value.

Regarding the configuration of the management device of the present embodiment has been described above, an example of the device implementing hardware described above is a computer equipped with CPU, RAM, ROM, a hard disk, a display, a keyboard, a mouse, a communication interface, and the like The above-described device may be realized by storing a program having modules that implement the above-mentioned functions in the RAM or the ROM, and executing such a program by the CPU. The program described above also falls within the scope of the present disclosure.

The invention claimed is:

1. A management device, comprising:

a blockchain that is configured to record transaction data of material of a product;

a variation range registration unit that is configured to register, on the blockchain, data indicative of a variation range, the variation range being an allowable range of a weight of material in a transaction process;

a transaction data registration unit that is configured to receive an input of the transaction data including data of a weight of material and is configured to register the transaction data on the blockchain;

a variation range update unit that is configured to periodically update the data of the variation range based on a calculation using an actual measurement value of the weight of the material and the data of the weight of the material recorded on the blockchain;

a determination unit that is configured to determine whether the actual measurement value of the weight of the material in the transaction process falls within the variation range registered on the blockchain; and an output unit that is configured to output a warning when the variation range is determined not to fall within the variation range.

2. A management system, comprising:

a blockchain that is configured to record transaction data of material of a product;

a management device comprising a computer having a processor and memory, the management device configured to provide:

a variation range registration unit that is configured to register, on the blockchain, data indicative of a variation range, the variation range being an allowable range of a weight of material in a transaction process;

a transaction data registration unit that is configured to receive an input of the transaction data including data of a weight of material and is configured to register the transaction data on the blockchain;

a variation range update unit that is configured to periodically update the data of the variation range based on a calculation using an actual measurement value of the weight of the material and the data of the weight of the material recorded on the blockchain;

a determination unit that is configured to determine whether the actual measurement value of the weight of the material in the transaction process falls within the variation range registered on the blockchain; and an output unit that is configured to output a warning when the variation range is determined not to fall within the variation range; and a user device that is configured to receive an input of the transaction data and to transmit the received transaction data to the management device, wherein the transaction data registration unit of the management device is further configured to register the transaction data received from the user device.

3. A management method for recording, on a blockchain, and managing transaction data of material of a product, the management method comprising steps of:

registering, with a management device, data indicative of a variation range on the blockchain, the variation range being an allowable range of a weight of material in a transaction process; and receiving, with the management device, an input of the transaction data including data of a weight of the material and registering the transaction data on the blockchain;

periodically updating the data of the variation range based on a calculation using an actual measurement value of the weight of the material and the data of the weight of the material recorded on the blockchain;

determining whether the actual measurement value of the weight of the material in the transaction process falls within the variation range registered on the blockchain; and outputting a warning when the variation range is determined not to fall within the variation range.

4. A non-transitory, computer readable, tangible storage medium storing a program for recording, on a blockchain, and managing transaction data of material of a product, the program causing a computer to perform steps of:

registering, on the blockchain, data indicative of a variation range that is an allowable range of a weight of material in a transaction process; and receiving an input of the transaction data including data of a weight of the material and registering the transaction data on the blockchain;

periodically updating the data of the variation range based on a calculation using an actual measurement value of the weight of the material and the data of the weight of the material recorded on the blockchain;

determining whether the actual measurement value of the weight of the material in the transaction process falls within the variation range registered on the blockchain; and outputting a warning when the variation range is determined not to fall within the variation range.

* * * * *